US006758798B2

(12) United States Patent
Fioroni

(10) Patent No.: US 6,758,798 B2
(45) Date of Patent: Jul. 6, 2004

(54) MACHINE-TOOL WITH CLOSED STRUCTURE AND ERGONOMIC ARRANGEMENT OF PARTS OF SAID MACHINE-TOOL

(75) Inventor: Claude Fioroni, Castres (FR)

(73) Assignee: Renault Automation Comau, Meudon la Foret (FR)

( * ) Notice: Subject to any disclaimer, the term of this patent is extended or adjusted under 35 U.S.C. 154(b) by 0 days.

(21) Appl. No.: 09/508,111

(22) PCT Filed: Jul. 15, 1999

(86) PCT No.: PCT/FR99/01721

§ 371 (c)(1),
(2), (4) Date: Mar. 20, 2000

(87) PCT Pub. No.: WO00/05029

PCT Pub. Date: Feb. 3, 2000

(65) Prior Publication Data

US 2003/0095843 A1 May 22, 2003

(30) Foreign Application Priority Data

Jul. 20, 1998 (FR) ............................................. 9809201

(51) Int. Cl.[7] ........................ B23Q 3/157; B23Q 11/08; B23Q 7/04; B23C 1/02
(52) U.S. Cl. ........................ 483/14; 409/235; 409/137; 409/134; 409/172; 409/236; 483/42; 483/901; 408/234; 29/563
(58) Field of Search ................................ 409/235, 137, 409/134, 172, 236, 202, 212, 190, 238; 408/234; 483/14, 43, 42, 901; 29/563; 82/149; 451/363, 340, 339

(56) References Cited

U.S. PATENT DOCUMENTS

| | | | | |
|---|---|---|---|---|
| 2,281,313 A | * | 4/1942 | Kumnick | 451/456 |
| 4,203,204 A | * | 5/1980 | Murphy | 29/703 |
| 4,229,866 A | * | 10/1980 | Berthier | 409/235 |
| 4,359,815 A | * | 11/1982 | Toyoda | 483/14 |
| 4,621,407 A | * | 11/1986 | Suzuki | 483/56 |
| 4,646,422 A | * | 3/1987 | McMurtry | 483/14 |
| 4,837,919 A | * | 6/1989 | Hoppe | 483/38 |
| 4,844,678 A | * | 7/1989 | Schenk | 29/563 |
| 4,947,538 A | * | 8/1990 | McMurtry | 483/14 |
| 4,991,706 A | * | 2/1991 | Kitamura | 29/33 P |
| 5,172,464 A | * | 12/1992 | Kitamura et al. | 29/563 |
| 5,340,247 A | * | 8/1994 | Cuneo et al. | 409/202 |
| 5,429,460 A | * | 7/1995 | Campian | 409/202 |
| 5,439,431 A | * | 8/1995 | Hessbruggen et al. | 483/14 |
| 5,586,848 A | * | 12/1996 | Suwijn | 409/137 |
| 5,611,137 A | * | 3/1997 | Braun | 409/202 |
| 5,911,888 A | * | 6/1999 | Girardin | 219/69.11 |
| 6,068,431 A | * | 5/2000 | Line | 409/202 |
| 6,113,324 A | * | 9/2000 | Huber | 409/235 |
| 6,116,830 A | * | 9/2000 | Azema | 409/134 |
| 6,428,453 B1 | * | 8/2002 | Hoppe et al. | 409/202 |
| 6,439,813 B1 | * | 8/2002 | Repossini | 409/235 |

FOREIGN PATENT DOCUMENTS

| | | | |
|---|---|---|---|
| DE | 3640149 A1 | * | 6/1987 |
| EP | 0816012 A1 | * | 1/1998 |
| EP | 0846523 A1 | * | 6/1998 |
| FR | 2742519 A1 | * | 6/1997 |
| JP | 01146631 A | * | 6/1989 |
| JP | 4-105846 A | * | 4/1992 |
| JP | 9-285940 A | * | 11/1997 |
| JP | 10-263959 A | * | 10/1998 |

* cited by examiner

Primary Examiner—Erica Cadugan
(74) Attorney, Agent, or Firm—Oblon, Spivak, McClelland, Maier & Neustadt, P.C.

(57) ABSTRACT

A machining machine-tool having a fixed frame with a closed structure. The machining zone is delimited by the fixed frame internal surfaces and includes a machining head supporting the driving unit of a machine-tool. The machine-tool fixed frame has a C-shaped profile, and ends of branches of the C are linked to the machine-tool machining head. The ergonomic arrangement of the machine-tool functional parts is also considered.

9 Claims, 4 Drawing Sheets

MACHINE-TOOL WITH CLOSED STRUCTURE AND ERGONOMIC ARRANGEMENT OF PARTS OF SAID MACHINE-TOOL

BACKGROUND OF THE INVENTION

1. Field of the Invention

The present invention relates to the field of machining and more particularly to adaptations of machine tool frames allowing to realise machining and more particularly milling under the best conditions.

2. Discussion of the Background

Classically, the workpiece is placed in front of a tool, such as a milling tool, turning at high speed and held by a frame fitted with slide blocks permitting a translation of the tool in relation with the workpiece. This rectilinear translation defines the generating trajectory of a plan on the workpiece after passage of the tool.

The stress and temperature rise generated by the cutting process, and in particular when the machine tool is a high-rate machine tool, create deformations and particularly deformations of the frame requiring until now the use of bulky components.

In fact, the lack of rigidity of a frame can lead to bad machining and must therefore be solved in particular when the size of the components and the speed of execution are such that the stress and deformations are increased. The need to obviate to the aforementioned problems is all the more important as the precision required for such machinings is more and more exacting. Consequently, a first solution consisted in oversizing the frames of machine tools submitted or that may be submitted to such deformations so that these deformations did not affect the precision of the machining achieved.

Another solution to eliminate the deformations due to the stress caused by cutting resides in the use of an actuator ensuring a stress on the frame of the machine tool in the opposite direction to the stress caused by cutting, which if it is well orientated, balances the mechanical forces system.

Another solution is revealed in French Patent N° 2 701 881, which, by a subsiduary device, transforms an open-structure machine tool into a closed-structure machine tool. The open-structure machine tool is of the type of which comprising a vertical upright which moves along a slide block along the X axis, fixed on a base, said vertical upright comprising an overhanging crossbeam along which moves, along the Y axis, a spindle support moving along an axis orthogonal to the aforementioned axes, along the Z axis. To obviate the aforementioned inconveniences, said machine tool comprises an additional structure conceived to be situated at the level of its open side, fitted with a connecting device which slides along the said structure, said connecting device conceived to be linked to the free end of the said crossbeam so as to constitute a machine with a gantry with a closed-structure frame. Closing the structure of the frame enables to relieve the structure but also to measure the constraints applied to the said frame so as to work out and size under the best conditions the components of the frame.

The passage from an open-structure to a closed-structure enables therefore to do away with the stress and deformations due to machining operations.

The disdadvantage to the device described in the aforementioned patent resides in the fact that the structure enabling to close the frame and thus to balance the mechanical forces system constituted by the frame, is only additional. In fact, for access reasons, the additional structure is retractable and does not close permanently the structure of the frame.

SUMMARY OF THE INVENTION

In view of this situation, the applicant has carried out research on a new concept of arrangement of machine tools and in particular of milling machine tool ensuring the normal functions of a high-rate machine tool while obviating to the aforementioned disadvantages and in proposing a closed-structure frame.

This research has led to the novel conception of a machine tool adopting an original arrangement of its components.

According to the main characteristic of the invention, the machining machine tool of the type of those adopting a closed-structure frame, the machining being realised inside the frame, is remarkable in that the frame of the said machine tool adopts a C-shaped profile, the ends of the said C being linked by the operating head of the machine tool.

This characteristic is particularly advantageous in that it enables on one hand, to respect the need to get rid of the deformations due to the stress from cutting in offering a frame with a closed-structure, and on the other hand, in realising the closing of this structure indefinitely and by means of the operating head of the machine tool.

Furthermore, using the arrangement of the operating head inside the C shaped by the frame holding it, has for advantage to reduce the volume of the machining zone and thus to confine or to limit the zones subjected to the projection of swarf, liquid spurts and to a stale atmosphere. Also, this limitation of the machining zone enables an easier evacuation of the aforementioned effluents as well of an improvement in the casing.

The arrangement of the frame, adopting a C-shape, closed by the operating head of the machine tool has also for advantage to offer a machine tool dedicated to a forced manufacturing rate which, geometrically, forms a tunnel for passage of the workpieces.

According to another particularly advantageous characteristic of the invention, the machine tool is of the type of which the operating head is mobile and is remarkable in that each end of the branches of the C-shaped profile of the frame holds a slide block ensuring support and guide of the said operating head in its machining movements.

Therefore, the machine tool of the invention does not only close a C-shaped frame by means of its operating head but also offers to use judiciously the ends of the C formed by the frame to support the slide blocks which will ensure guiding of the operating head during its displacements.

In the mind of the applicant, the structure of the machine tool of the invention such as previously described and according to the advantages it brings, is particularly suited when the machining realised by the said operating head is milling.

The fundamental concepts of the invention having just been detailed hereinabove in their most elementary form, more details and characteristics will come out more clearly when reading the description hereinafter using as a non limitative example and having regard to the attached drawings, an embodiment of a machine tool in accordance with the invention.

DESCRIPTION OF THE PREFERRED EMBODIMENT

Figure 1:
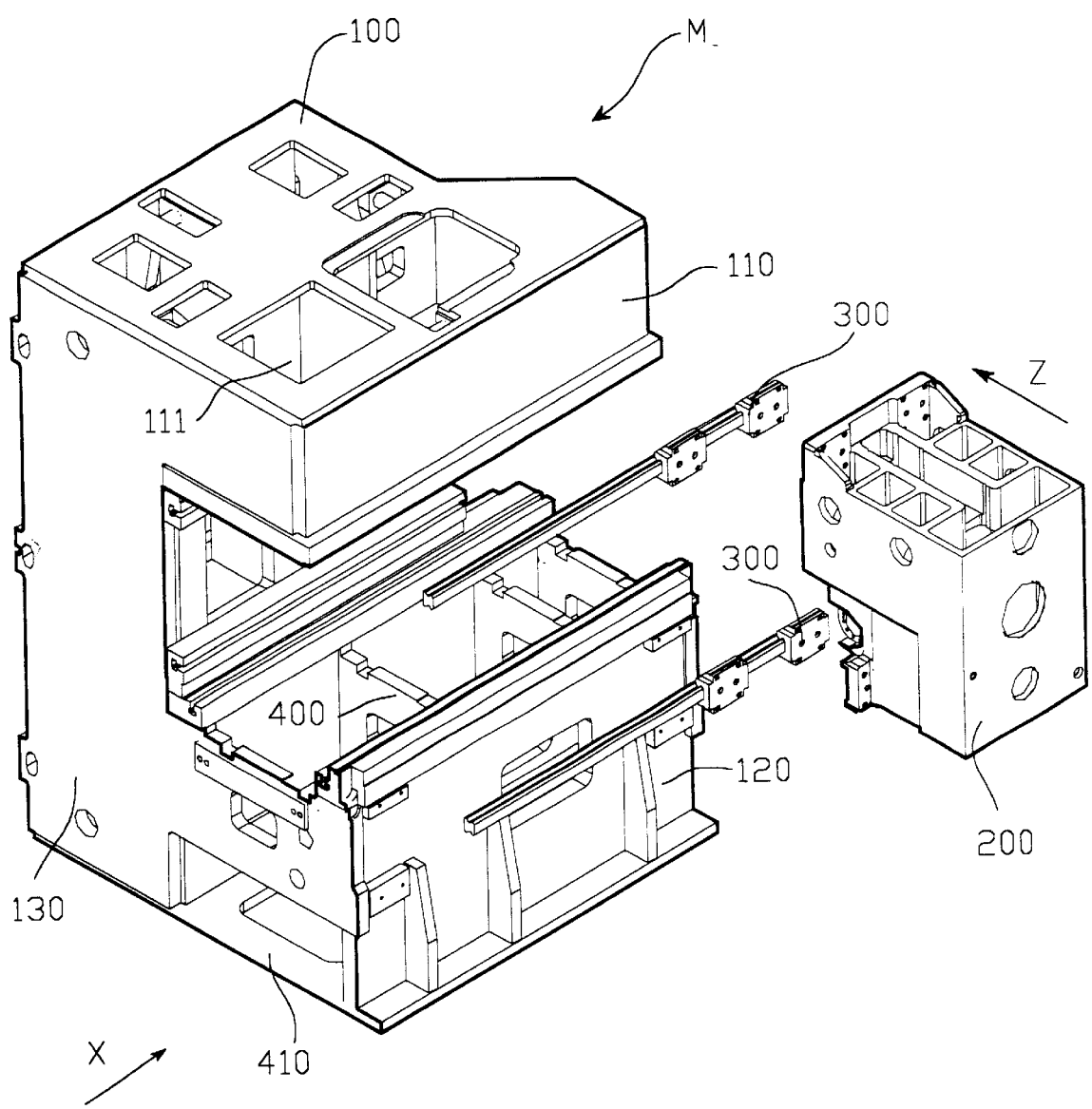
FIG. 1 is a general schematic view in front exploded perpective of the machine tool of the invention.

The machine tool referenced as M as a whole such as illustrated on the drawing of FIG. 1, is of the type of those adopting a frame 100 with closed-structure, the machining zone being defined by the internal surfaces of the frame 100 and comprising an operating head 200 ensuring the support of the driving means of a machining tool. According to the main characteristic of the invention, the frame 100 of the said machine tool M adopts a C-shaped profile, the ends of the branches 110 and 120 of the said C being linked by the operating head 200 of the machine tool M.

Therefore, the geometry of machine tool M defines a tunnel for the passage of workpieces along a tranfer axis symbolised by arrow X. The tool, not shown, ensures classically a translation perpendicular to the transfer axis inside the said tunnel along axis Z. This tunnel for passage of the workpieces defining a transfer axis of the latter is particularly suited for high-rate machining.

The machine tool M such as illustrated is also of the type of which the operating head 200 is mobile. Consequently, apart from the movement perpendicular with the transfer axis of the workpieces realised by the tool, the operating head 200 of the machine tool M ensures a movement parallel with the transfer axis. To this aim and according to a particularly advantageous characteristic of the invention, each end of the branches 110 and 120 of the C shaped by the profile of the frame 100, is fitted with a slide block 300 for supporting and guiding the said operating head 200 in its machining movements. The opening of the C constituted by the frame 100 is therefore closed, by means of the sliding blocks for guiding, through the operating head 200.

From this particularly judicious arrangement, the machine tool of the invention carries out two functions, i.e.:

the closing of the mechanical forces system defined by the frame 100 by means of the operating head so as to do away with the mechanical constraints and their consequences on the said frame 100, the guiding of the said operating head according to a movement of which the direction is parallel with the transfer axis X, movement which is necessary to the machining of the workpiece, in using the particular geometry of the frame 100 to arrange the guiding means.

According to a preferred but non limitative embodiment of the said machine tool M such as conceived, the machining realised by the said operating head is milling. Even though it is theorically applicable to all types of machining, the closed-structure of the machine tool M of the invention and the use of this geometry to situate the guidings of the operating head enabling the movement of the latter as well as its accessibility finds an application particularly well suited to the machining of the milling type of which the components and the rate of realisation required, need a frame with a very rigid structure.

The frame 100 is C-shaped with, arranged at the ends 110 and 120 of this C, an operating head 200 mobile along the transfer axis X, and has in fact for other advantage to bring a very large accessibility at the rear of the operating head 200.

Obviously, the advantages mentioned above are combined with those already known of a closed-structure of which the one consisting in machining in a quasi-closed space defining precisely the machining zone of the tool driven by the operating head 200.

The slide blocks 300 as illustrated, situated at the ends 110 and 120, are identical and oriented in the same way. The two of them offer a support perpendicular to the transfer axis of the workpieces to the operating head while enabling the closing of the mechanical forces system constituted by the operating head 200 and the C-shaped frame 100.

According to a preferred but non limitative embodiment, it is the vertical surfaces constituting the ends of the branches 110 and 120 of the C shaped by the frame 100 of the machine tool M, which support the fixed part of the slide blocks 300 for guiding the movement along axis X of the operating head 200. Furthermore, the said operating head is placed against the C-shaped frame 100 and is not arranged between the two branches 110 and 120 of the frame 100 but closes the machining zone which comes between the ends of the two branches of the frame 100.

According to a particularly advantageous embodiment, the rotation axis of the tool of the operating head 200 machining inside the C is parallel with the branches of the C shaped by the frame 100. This particular arrangement has for advantage to balance the structure of the machine tool while offering a simplification of the frame of the machine tool M.

According to a preferred but non limitative illustrated embodiment, the frame 100 comprises parallel with the transfer axis X and in the machining zone defined by the branches 110 and 120 of the C, two pairs of grooves adopting a T-shape profile and open on the machining zone. A first pair is integral with the lower branch 120 of the frame 100 and arranged in such a way that the horizontal rod of the T is parallel to the branches of the C. The second pair is integral with the central vertical part 130 of the C and arranged so that the horizontal rod of the T is perpendicular to the branches of the C. The function of these grooves is to offer several possibilities of fixation for the mounting of part-holder for workpiece to be machined.

Therefore, the particular shape of the frame 100 enables to support two pairs of grooves. Furthermore, a clamping device inserted in the upper branch 110 of frame 100 for reasons of space needed can function in suitability with the first pair of grooves in T so as to offer a clamping of the workpiece of the type of clamping executed from above. The particular shape of the frame 100 thus enables to offer several types of clamping.

Figure 2:
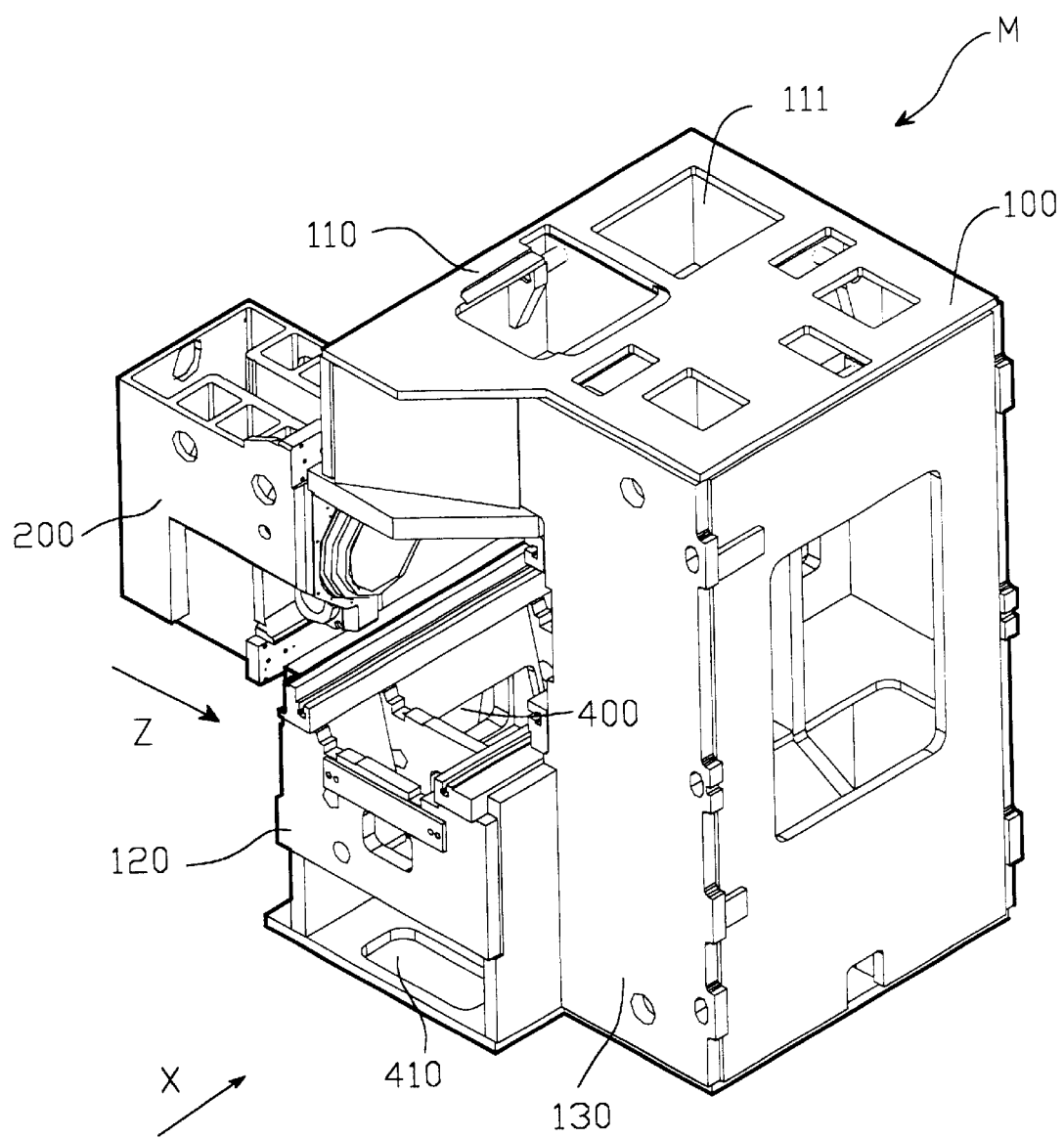
FIG. 2 is a general schematic view in rear perspective of the machine tool of FIG. 1.

Furthermore, the lower branch 120 of the C-shaped frame 100 is pre-shaped so as to receive a device for collecting swarf such as a trough, a conveyor belt or even a vibrating wall device. The arrangement in C enables in fact to conceive a machining zone comprising a maximum of vertical walls, walls enabling to direct the swarf towards their collecting zone 400. Therefore, as illustrated on the drawings of FIGS. 1 and 2, the lower branch 120 is fitted in its lower part with a passage 410 communicating with the swarf collecting zone 400, which passage can comprise a trough 411 as illustrated on the drawing of FIG. 4 or a swarf conveyor.

In order to still make the most of the advantages of the geometry of a C-shaped frame 100, the upper branch 110 is fitted with a smoke suction device. The particular geometry of this machine tool M thus enables an optimum control of the effluents i.e. swarf and smoke arising from the machining operations. For this purpose, as illustrated on the drawing of FIGS. 1 and 2, the opening referenced 111 is arranged in the said upper branch 110 and communicates with the machining zone defined by the branches 110 and 120 of the C shaped by the frame 100.

Figure 4:
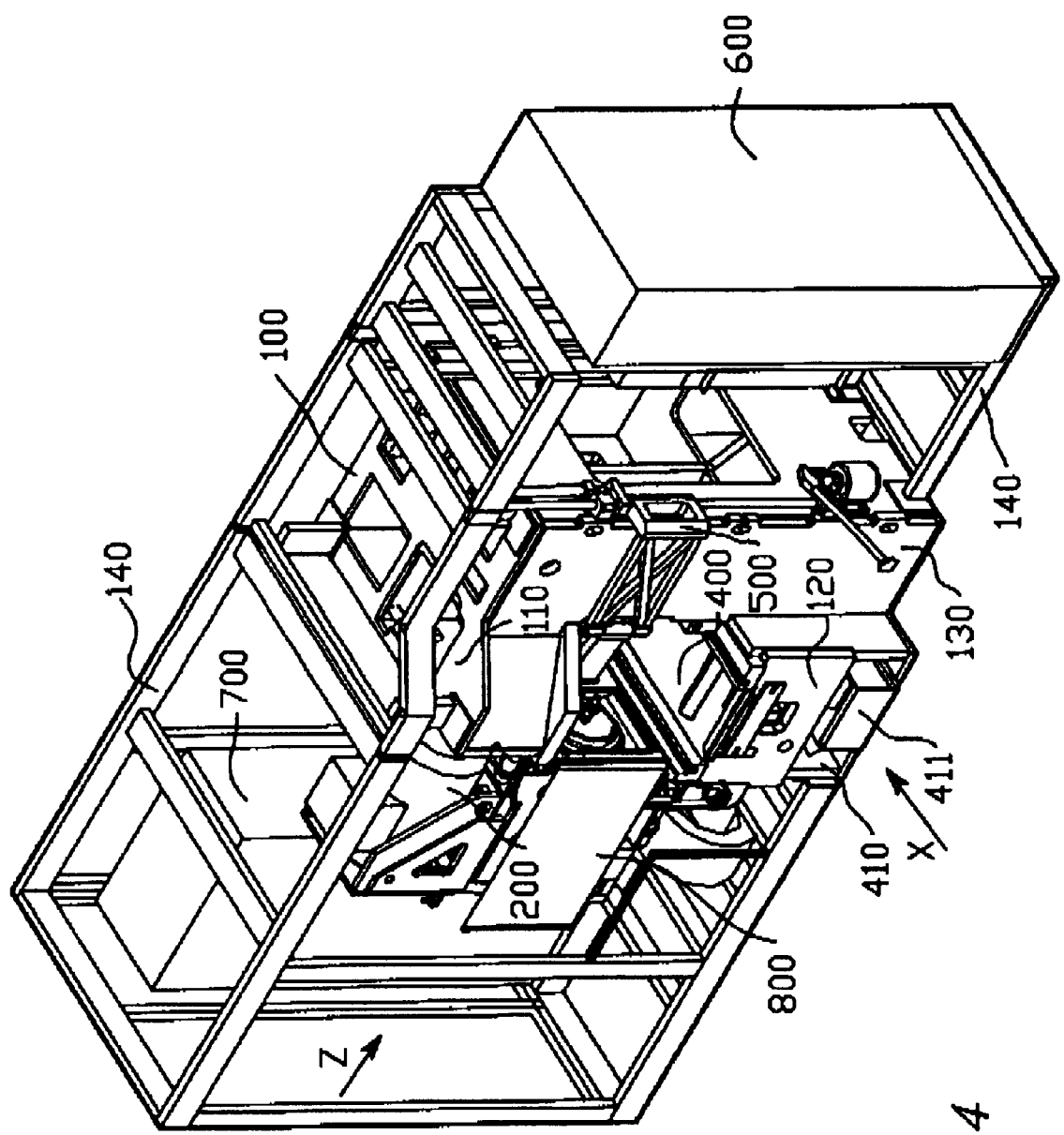
FIG. 4 is a general schematic view in perspective illustrating the original arrangement of the functional parts of the machine tool in accordance with the invention.

To complete the demarcation of the machining zone and in particular of the machining zone of a machine tool M such as illustrated and dedicated to milling operations, the movement of the operating head being limited to a defined axis, a mobile vertical protection shield 800, depicted in FIG. 4, against the projection of swarf has a height equal to the separation between the two branches of the C shaped by the frame and follows the rectilinear movements of the operating head 200.

The particular geometry of the frame 100 and the number of movements limited by the practice enable to insert a vertical wall for protection ensuring a leaktight separation at this place of the machine tool M.

This machine tool M has also the particularity that access to the tool or the tool carrier spindle is difficult on account of the geometry of its frame 100 having for advantage and disadvantage the demarcation of the machining zone. In fact, the machining operation being realised inside the C shaped by the frame 100, it is particularly difficult to have access to the tool or to the spindle for their exchange operation. Even though this exchange operation does not happen frequently, it is necessary to handle the spindle, the tool and/or the workpiece. The difficulty is all the more important that the spindle or the tool of a high-rate machine tool for milling ensuring a machining at a high production rate is of large dimension and thus of a particularly considerable weight.

In answer, the applicant has judiciously conceived a handling device 500 particularly suited to the geometry of the machine tool M of the invention, but able to adapt to other types of machine tools. With this aim, as illustrated by FIGS. 3 and 4, the rear vertical part 130 of the C shaped by the frame 100 coming opposite the tool is fitted with an articulated device 500 coming between the branches 110 and 120 of the C, so as to ensure the handling operations of the tool and/or the workpiece enabling either to retrieve the tool or the spindle driving the tool of the operating head 200, or to handle the workpiece machined or to be machined.

Figure 3:
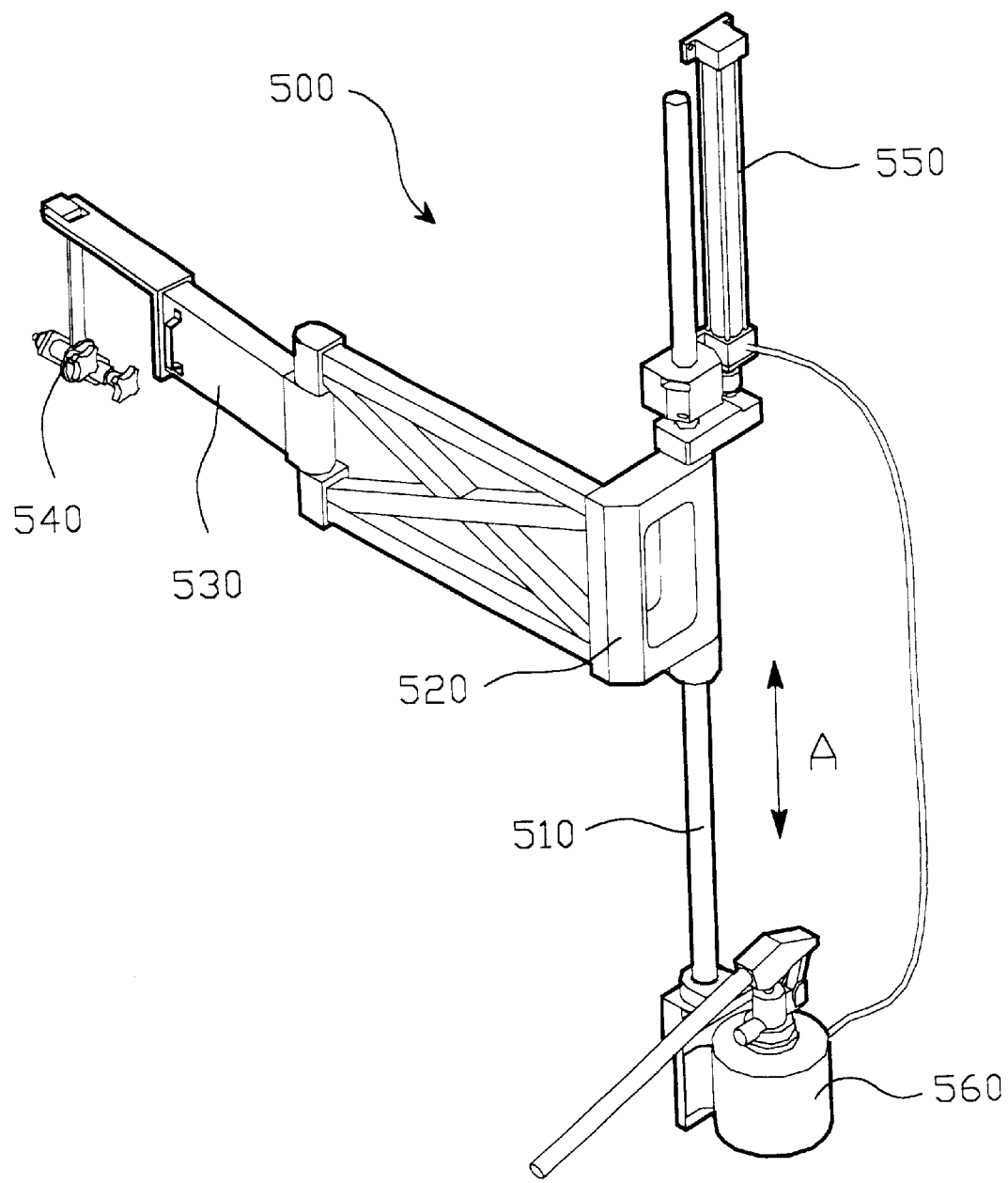
FIG. 3 is a detailed schematic view in perspective of a handling device particularly suited to the machine tool of the invention.

As illustrated on the drawing of FIG. 3, this articulated handling device 500 comprises a vertical guide column 510 integral with the frame 100 on which moves, in an articulated manner, a bracket 520 fitted at its free end with an articulated arm 530 which arm comprises a handling subset 540, the ascension or lowering of the bracket 520 along the guiding column 510 according to the double arrow A is controlled by the action of a jack 550 of which the rod comes in and out by the manual action of a handler on an energy generator. As illustrated by way of an example, the energy generator is constituted in this case by a manual hydraulic pump 560 feeding the jack 550. The adoption of a manual device activated by the handler is particularly suited to the practice in that the handling operations are on an ad hoc basis. An independant manual device has also for advantage to still be operational during the stoppage of the machine tool for whatever reason.

The different articulations between column 510, bracket 520 and arm 530 are arranged so that the device 500 as a whole can go from a folded or an extended waiting position at the rear of the frame 100 of the machine tool M to an extended position for removing or retrieving inside the machining zone of the said machine tool M.

FIG. 4 illustrates the situation of the said handling device 500 in relation to the frame 100 and in particular in an extended position inside the machining zone defined by the inner surfaces of the C shaped by the frame 100 of the machine tool M.

The closed-structure of the said machine tool M with its characteristic which consists in closing its C-shaped frame 100 by means of its own operating head 200 mounted mobile, enables to consider an ergonomic arrangement of the functional parts of the machine tool M. Therefore, according to a particularly advantageous embodiment of the invention, shown on the drawing of FIG. 4, the applicant has conceived an ergonomic arrangement of the functional parts of a closed-structure machining machine tool M of the type of which comprising a frame 100 adopting a C-shape profile, the ends 110 and 120 of the said C being linked by means of the operating head 200 of the machine tool M, said machine tool being mobile, each end of the branches of the C of the profile of the frame 100 being fitted with a slide block 300 for supporting and guiding the said operating head 200 in its machining movements, said machine tool M comprising amongst others, the classical components such as electric cupboards 600 and regulation group 700 and defining a rear zone comprising the vertical part 130 of the C shaped by the frame 100 and a front zone comprising the operating head 200. This arrangement is remarkable in that the rear zone of the machine tool comprises the electric cupboards 600 integral with the frame 100 by means of a tubular frame 140 and arranged so as to leave a free space between them and the vertical part 130 of the C shaped by the frame 100, which free space receives the articulated handling device 500 in its folded or extended waiting position for handling. This arrangement is also remarkable in that the front zone of the machine tool M comprises the regulation group 700 which, integral with the frame 100 by means of the said aforementioned tubular frame 140, is arranged so as to leave free access at the rear of the operating head 200, the only functional opening passing through being constituted by the machining zone defining the transfer axis X of the workpieces to be machined.

According to a non illustrated embodiment, the aforesaid front zone is surrounded by a rigid chamber ensuring the function of protection box around the operating head 200 and the regulation group.

It is understood that the machining machine-tool and the ergonomic arrangement of the functional parts of such a machine tool which have been described and represented hereinabove, are given for the purpose of disclosure and not limitation. It is obvious that various arrangements of, as well as modifications and improvements to, the example hereinabove will be possible without departing from the scope of the invention taken in its broadest aspects and spirit.

What is claimed is:

1. A machine-tool comprising:
   a fixed frame having internal surfaces defining a machining zone;
   an operating head configured to support a driving device for driving a tool, wherein the frame has a C-shaped profile with a vertical rear member and horizontal branches having front ends with terminal end surfaces linked by the operating head, the operating head being provided outside of the horizontal branches; and
   an articulated handling device provided on a rear of the vertical rear member outside of the machining zone and arranged so that the articulated handling device as a whole can go from a folded or an extended waiting position at the rear of the frame to an extended position for removing or retrieving inside the machining zone, and wherein movement of the operating head is limited to a defined axis.

2. The machine-tool according to claim 1, wherein the operating head is mobile and wherein each terminal end surface of the branches of the C-shaped profile holds a slide block to support and guide the operating head during machining movements of the operating head.

3. The machine-tool according to claim 1, wherein the operating head has a tool rotation axis that is parallel with a direction of extension of the branches of the C-shaped profile.

4. The machine-tool according to claim 1, wherein a lower branch of the C-shaped profile is configured to receive a swarf collecting device.

5. The machine-tool according to claim 1, wherein an upper branch of the C-shaped profile is configured to receive a smoke suction device.

6. The machine-tool according to claim 1, wherein a machining operation realised by the operating head is milling.

7. The machine-tool according to claim 1, and further comprising a mobile vertical protection shield, which protects against the projection of swarf, has a height equal to a separation between the branches of the C-shaped profile and follows rectilinear movements of the operating head.

8. The machine-tool according to claim 1, wherein said terminal end surfaces are each joined to the operating head by slide blocks configured to allow sliding motion of the operating head along only one axis.

9. The machine-tool according to claim 1, wherein the articulated handling device comprises a vertical guide column integral with the frame and on which moves in an articulated manner a bracket fitted at a free end with an articulated arm comprising a handling subset, wherein ascension or lowering of the bracket along the guide column is controlled by a jack having a rod that extends and retracts by manual action of a handler on a generator.

* * * * *